United States Patent
Rahman et al.

(10) Patent No.: US 9,788,011 B2
(45) Date of Patent: *Oct. 10, 2017

(54) FASTER AND MORE EFFICIENT DIFFERENT PRECISION SUM OF ABSOLUTE DIFFERENCES FOR DYNAMICALLY CONFIGURABLE BLOCK SEARCHES FOR MOTION ESTIMATION

(71) Applicant: TEXAS INSTRUMENTS INCORPORATED, Dallas, TX (US)

(72) Inventors: Mujibur Rahman, Plano, TX (US); Djordje Senicic, Germantown, MD (US); Timothy D. Anderson, University Park, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/403,311

(22) Filed: Jan. 11, 2017

(65) Prior Publication Data

US 2017/0150175 A1 May 25, 2017

Related U.S. Application Data

(62) Division of application No. 14/327,002, filed on Jul. 9, 2014, now Pat. No. 9,582,273.

(Continued)

(51) Int. Cl.
*G06F 9/30* (2006.01)
*H04N 19/43* (2014.01)
(Continued)

(52) U.S. Cl.
CPC .......... *H04N 19/56* (2014.11); *G06F 9/30036* (2013.01); *G06F 9/30109* (2013.01);
(Continued)

(58) Field of Classification Search
CPC .......... H04N 19/436; G06F 7/544; G06F 7/57; G06F 2207/5542; G06F 9/30036; G06F 9/30109; G06F 9/3885; G06F 9/3887
See application file for complete search history.

(56) References Cited

U.S. PATENT DOCUMENTS 7,126,991 B1    10/2006  Mimar
8,175,161 B1    5/2012   Anisimov
(Continued)

OTHER PUBLICATIONS

S Wong, S. Vassiliadis, S. Cotofana, "A Sum of absolute differences implementation in FPGA Hardware", 28th Euromicro Conference, pp. 183-188, Sep. 2002.*

*Primary Examiner* — Matthew Sandifer
(74) *Attorney, Agent, or Firm* — Robert D. Marshall, Jr.; Charles A. Brill; Frank D. Cimino

(57) ABSTRACT

This invention is a digital signal processor form plural sums of absolute values (SAD) in a single operation. An operational unit performing a sum of absolute value operation comprising two sets of a plurality of rows, each row producing a SAD output. Plural absolute value difference units receive corresponding packed candidate pixel data and packed reference pixel data. A row summer sums the output of the absolute value difference units in the row. The candidate pixels are offset relative to the reference pixels by one pixel for each succeeding row in a set of rows. The two sets of rows operate on opposite halves of the candidate pixels packed within an instruction specified operand. The SAD operations can be performed on differing data widths employing carry chain control in the absolute difference unit and the row summers.

5 Claims, 14 Drawing Sheets

Related U.S. Application Data

(60) Provisional application No. 61/844,150, filed on Jul. 9, 2013.

(51) Int. Cl.
  *H04N 19/513*  (2014.01)
  *H04N 19/56*   (2014.01)
  *H04N 19/433*  (2014.01)

(52) U.S. Cl.
  CPC ......... *H04N 19/433* (2014.11); *H04N 19/521* (2014.11); *G06F 2207/5442* (2013.01)

(56) References Cited

U.S. PATENT DOCUMENTS

| | | |
|---|---|---|
| 8,184,696 B1 | 5/2012 | Chirila-Rus et al. |
| 2003/0005267 A1 | 1/2003 | Koba et al. |
| 2011/0093518 A1 | 4/2011 | Vaithianathan et al. |
| 2012/0027262 A1 | 2/2012 | Thomas |
| 2013/0003870 A1 | 1/2013 | Swan et al. |
| 2014/0019713 A1 | 1/2014 | Ould-Ahmed-Vall et al. |
| 2014/0122551 A1 | 5/2014 | Dogon et al. |
| 2014/0149720 A1 | 5/2014 | Muff et al. |

\* cited by examiner

526

| 31 | 29 | 28 | | | 12 | | 1 | 0 |
|---|---|---|---|---|---|---|---|---|
| creg | z | dst | src2 | scr1/cst | opcode | | | p |

| r14 | r13 | r12 | r11 | r10 | r9 | r8 | r7 | r6 | r5 | r4 | r3 | r2 | r1 | r0 |
|---|---|---|---|---|---|---|---|---|---|---|---|---|---|---|
| | | | | | | | c7 | c6 | c5 | c4 | c3 | c3 | c1 | c0 |

1600

| r14 | r13 | r12 | r11 | r10 | r9 | r8 | r7 | r6 | r5 | r4 | r3 | r2 | r1 | r0 |
|---|---|---|---|---|---|---|---|---|---|---|---|---|---|---|
| | | | | | | c7 | c6 | c5 | c4 | c3 | c3 | c1 | c0 | |

1610

| r14 | r13 | r12 | r11 | r10 | r9 | r8 | r7 | r6 | r5 | r4 | r3 | r2 | r1 | r0 |
|---|---|---|---|---|---|---|---|---|---|---|---|---|---|---|
| | | | | | c7 | c6 | c5 | c4 | c3 | c3 | c1 | c0 | | |

| r14 | r13 | r12 | r11 | r10 | r9 | r8 | r7 | r6 | r5 | r4 | r3 | r2 | r1 | r0 |
|---|---|---|---|---|---|---|---|---|---|---|---|---|---|---|
| | | | | c7 | c6 | c5 | c4 | c3 | c3 | c1 | c0 | | | |

| r14 | r13 | r12 | r11 | r10 | r9 | r8 | r7 | r6 | r5 | r4 | r3 | r2 | r1 | r0 |
|---|---|---|---|---|---|---|---|---|---|---|---|---|---|---|
| | | | c7 | c6 | c5 | c4 | c3 | c3 | c1 | c0 | | | | |

| r14 | r13 | r12 | r11 | r10 | r9 | r8 | r7 | r6 | r5 | r4 | r3 | r2 | r1 | r0 |
|---|---|---|---|---|---|---|---|---|---|---|---|---|---|---|
| | | c7 | c6 | c5 | c4 | c3 | c3 | c1 | c0 | | | | | |

| r14 | r13 | r12 | r11 | r10 | r9 | r8 | r7 | r6 | r5 | r4 | r3 | r2 | r1 | r0 |
|---|---|---|---|---|---|---|---|---|---|---|---|---|---|---|
| | c7 | c6 | c5 | c4 | c3 | c3 | c1 | c0 | | | | | | |

| r14 | r13 | r12 | r11 | r10 | r9 | r8 | r7 | r6 | r5 | r4 | r3 | r2 | r1 | r0 |
|---|---|---|---|---|---|---|---|---|---|---|---|---|---|---|
| c7 | c6 | c5 | c4 | c3 | c3 | c1 | c0 | | | | | | | |

1630

| r22 | r21 | r20 | r19 | r18 | r17 | r16 | r15 | r14 | r13 | r12 | r11 | r10 | r9 | r8 |
|---|---|---|---|---|---|---|---|---|---|---|---|---|---|---|
| | | | | | | | c15 | c14 | c13 | c12 | c11 | c10 | c9 | c8 |

1640

| r22 | r21 | r20 | r19 | r18 | r17 | r16 | r15 | r14 | r13 | r12 | r11 | r10 | r9 | r8 |
|---|---|---|---|---|---|---|---|---|---|---|---|---|---|---|
| | | | | | | c15 | c14 | c13 | c12 | c11 | c10 | c9 | c8 | |

1650

| r22 | r21 | r20 | r19 | r18 | r17 | r16 | r15 | r14 | r13 | r12 | r11 | r10 | r9 | r8 |
|---|---|---|---|---|---|---|---|---|---|---|---|---|---|---|
| | | | | | c15 | c14 | c13 | c12 | c11 | c10 | c9 | c8 | | |

| r22 | r21 | r20 | r19 | r18 | r17 | r16 | r15 | r14 | r13 | r12 | r11 | r10 | r9 | r8 |
|---|---|---|---|---|---|---|---|---|---|---|---|---|---|---|
| | | | | c15 | c14 | c13 | c12 | c11 | c10 | c9 | c8 | | | |

| r22 | r21 | r20 | r19 | r18 | r17 | r16 | r15 | r14 | r13 | r12 | r11 | r10 | r9 | r8 |
|---|---|---|---|---|---|---|---|---|---|---|---|---|---|---|
| | | | c15 | c14 | c13 | c12 | c11 | c10 | c9 | c8 | | | | |

| r22 | r21 | r20 | r19 | r18 | r17 | r16 | r15 | r14 | r13 | r12 | r11 | r10 | r9 | r8 |
|---|---|---|---|---|---|---|---|---|---|---|---|---|---|---|
| | | c15 | c14 | c13 | c12 | c11 | c10 | c9 | c8 | | | | | |

| r22 | r21 | r20 | r19 | r18 | r17 | r16 | r15 | r14 | r13 | r12 | r11 | r10 | r9 | r8 |
|---|---|---|---|---|---|---|---|---|---|---|---|---|---|---|
| | c15 | c14 | c13 | c12 | c11 | c10 | c9 | c8 | | | | | | |

| r22 | r21 | r20 | r19 | r18 | r17 | r16 | r15 | r14 | r13 | r12 | r11 | r10 | r9 | r8 |
|---|---|---|---|---|---|---|---|---|---|---|---|---|---|---|
| c15 | c14 | c13 | c12 | c11 | c10 | c9 | c8 | | | | | | | |

FASTER AND MORE EFFICIENT DIFFERENT PRECISION SUM OF ABSOLUTE DIFFERENCES FOR DYNAMICALLY CONFIGURABLE BLOCK SEARCHES FOR MOTION ESTIMATION

This application: is a divisional of U.S. patent application Ser. No. 14/327,002 filed Jul. 9, 2014.

CLAIM OF PRIORITY

This application claims priority under 35 U.S.C. 119(e)(1) to U.S. Provisional Application No. 61/844,150 filed Jul. 9, 2013.

TECHNICAL FIELD OF THE INVENTION

The technical field of this invention is digital data processing and more specifically sum of absolute difference calculations.

BACKGROUND OF THE INVENTION

This invention relates to the calculation of sum of absolute differences (SAD) between two pixel blocks. This computation is often used as a similarity measure. A lower the sum of absolute differences corresponds to a more similar pair of pixel blocks. This computation is widely used in determining a best motion vector in video compression. The two pixel blocks compared are corresponding locations in time adjacent frames. One block slides within an allowed range of motion and the sum of the absolute differences between the two pixel blocks determines their similarity. A motion vector is determined from the horizontal and vertical displacement between pixel blocks yielding the smallest sum of absolute differences (greatest similarity). This search for a best motion vector is thus very computationally intensive. The prior art implemented Sum of Absolute Difference (SAD) for specific macro block search, such as 16×16 or 8×8, using a single horizontal pixel line search for Full Search Block Matching (FSBM).

SUMMARY OF THE INVENTION

This invention is a digital signal processor which forms plural sums of absolute values (SAD) in a single operation. An operational unit performing a sum of absolute value operation comprises two sets of a plurality of rows. Each row produces a SAD output. Each row includes a plurality of absolute value difference units having a first input receiving corresponding packed candidate pixel data and a second input receiving corresponding packed reference pixel data. A row summer sums the output of the absolute value difference units in the row forming a sum output. The candidate pixels are offset relative to the reference pixels by one pixel for each succeeding row in a set of rows. The two sets of rows operate on opposite halves of the candidate pixels packed within an instruction specified operand.

Each absolute value difference unit of each row further receives a mask input. The SAD output is 0 if the corresponding mask input has a first digital state.

The SAD operations can be performed on differing data widths employing carry chain control in the absolute difference unit and the row summers.

BRIEF DESCRIPTION OF THE DRAWINGS

These and other aspects of this invention are illustrated in the drawings, in which:

FIG. 17 schematically illustrates the comparisons of the instruction illustrated in FIGS. 16A and 16B.

DETAILED DESCRIPTION OF PREFERRED EMBODIMENTS

Figure 1:
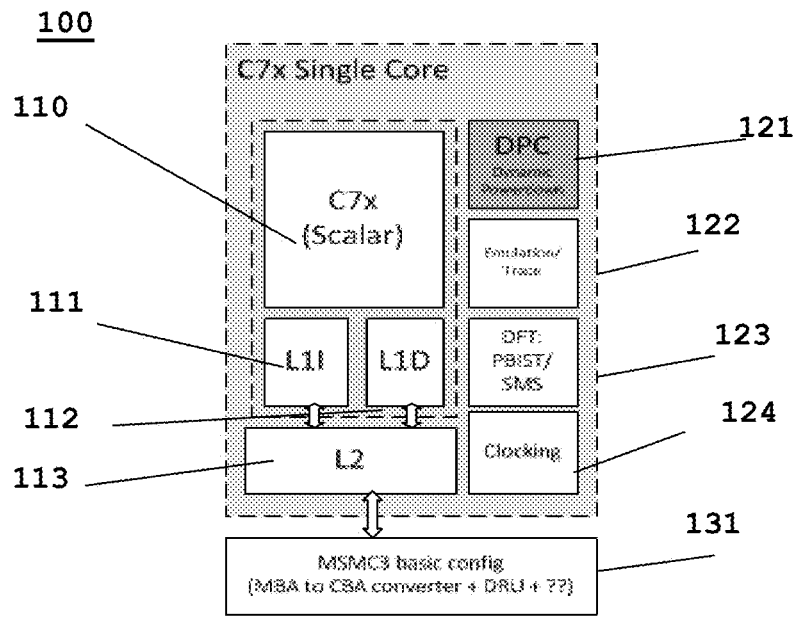
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
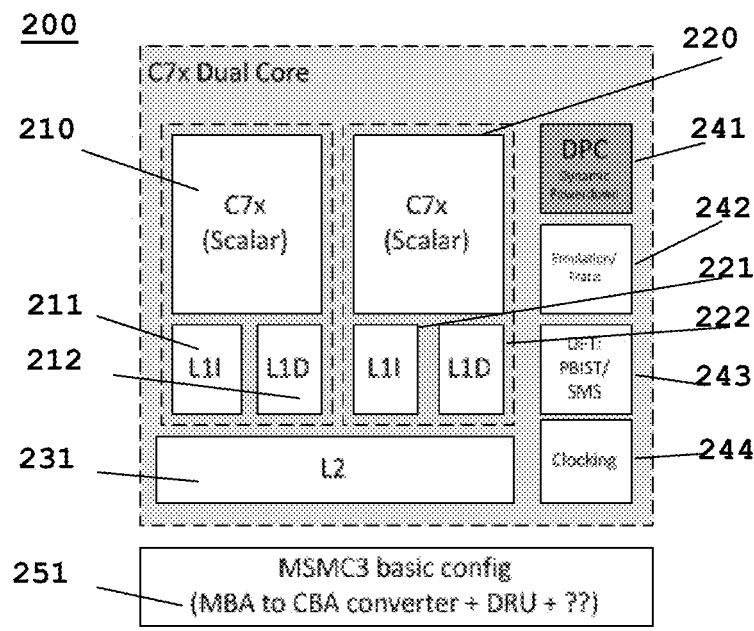
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in self test (PBIST) circuit 243 and clocking circuit 244. This single integrated circuit may also include memory controller 251.

Figure 3:
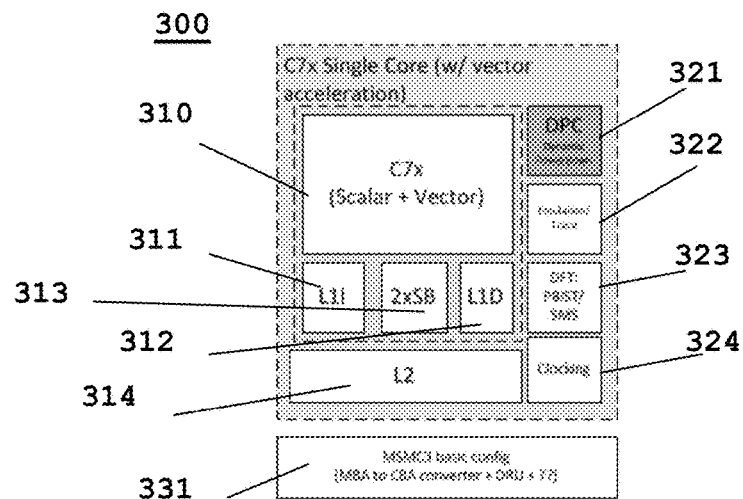
FIG. 3 illustrates a single core vector processor according to a further embodiment of this invention.
Figure 4:
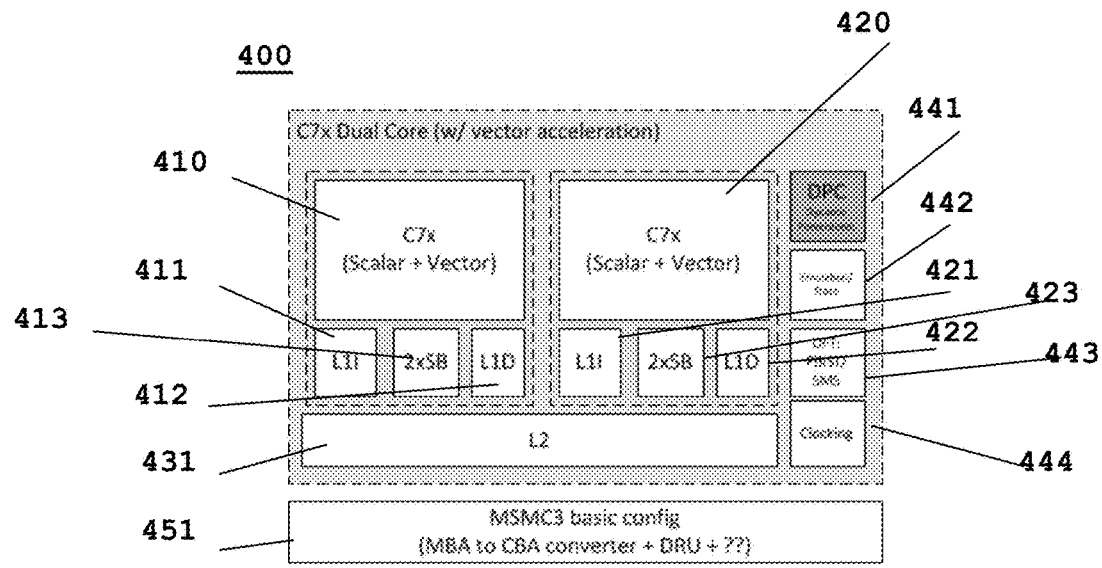
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units. As further described below Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
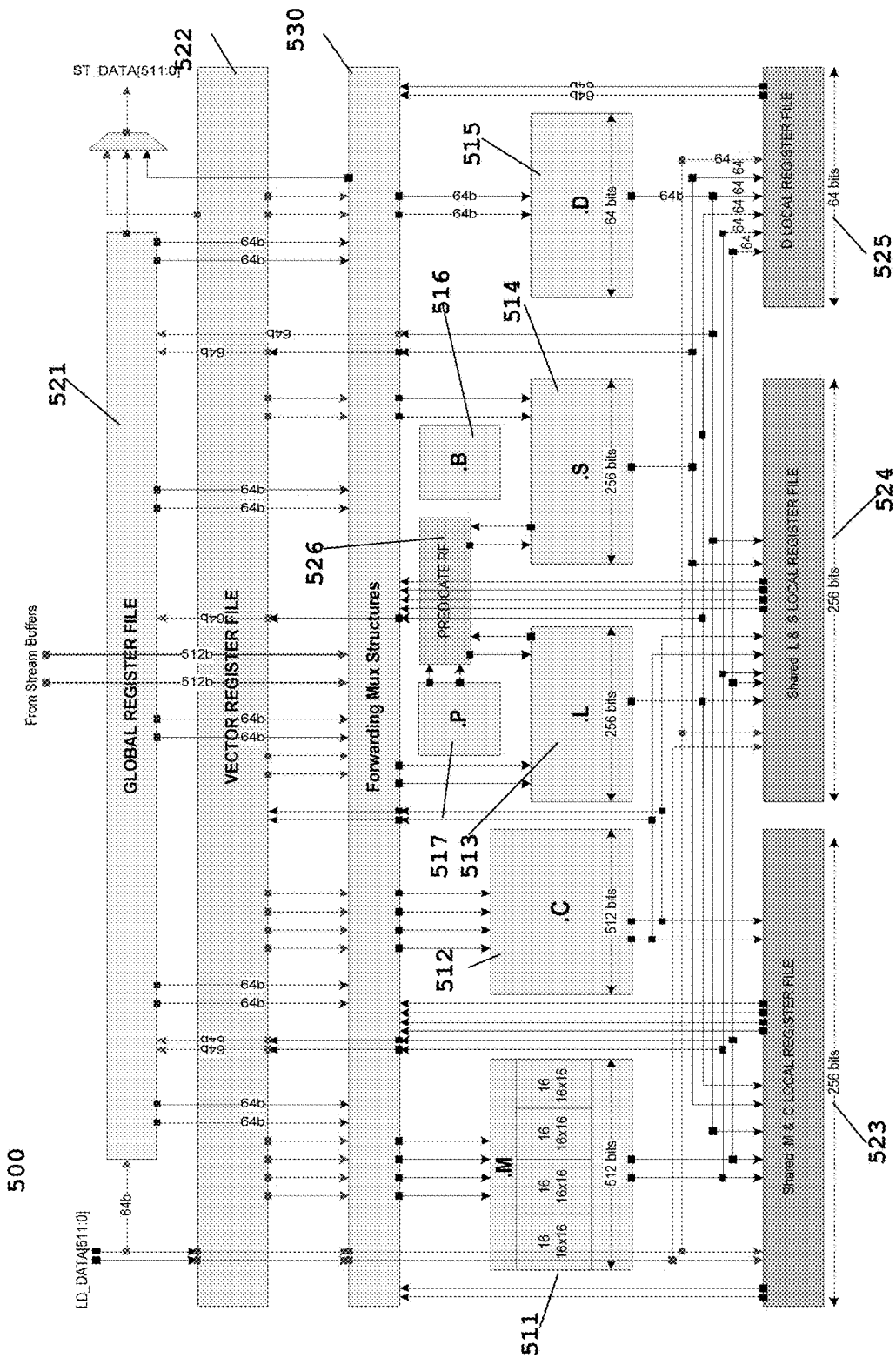
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They minimize the number of cache miss stalls since the stream buffer can bypass L1D cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU of this invention includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily performs multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and .C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various vector compare and minimum/maximum instructions which write results directly to predicate register file 526 (further described below). These comparisons include A=B, A>B, A≥B, A<B and A≤B. If the comparison is correct, a 1 bit is stored in the corresponding bit position within the predicate register. If the comparison fails, a 0 is stored in the corresponding bit position within the predicate register. Vector compare instructions assume byte (8 bit) data and thus generate 32 single bit results. Arithmetic unit 513 and arithmetic unit 514 perform various vector operations using a designated predicate register as explained below. Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table lookaside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers.

Predication unit 517 has direct access to the vector predication registers 526. Predication unit 517 performs different bit operations on the predication registers such as AND, ANDN, OR, XOR, NOR, BITR, NEG, SET, BITCNT (bit count), RMBD (right most bit detect), BIT Decimate and Expand, etc.

Figure 6:
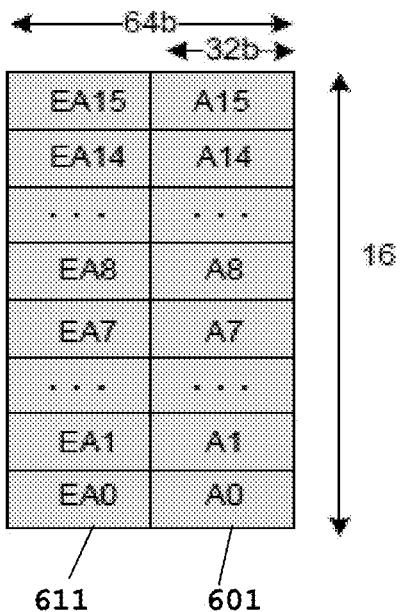
FIG. 6 illustrates the global scalar register file.

FIG. 6 illustrates global scalar register file 521. There are 16 independent 64-bit wide scalar registers. Each register of global scalar register file 521 can be read as 32-bits scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read or write to global scalar register file 521. The instruction type determines the data size. Global scalar register file 521 supports data types ranging in size from 8-bits through 64-bits. A vector instruction can also write to the 64-bit global scalar registers 521 with the upper 192 bit data of the vector discarded. A vector instruction can also read 64-bit data from the global scalar register file 511. In this case the operand is zero-extended in the upper 192-bit to form an input vector.

Figure 7:
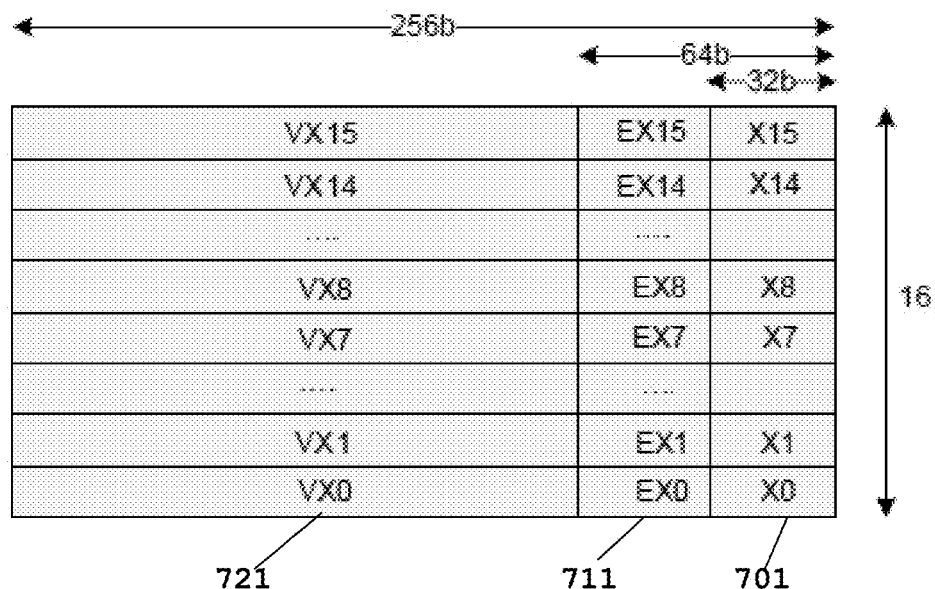
FIG. 7 illustrates global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

Figure 8:
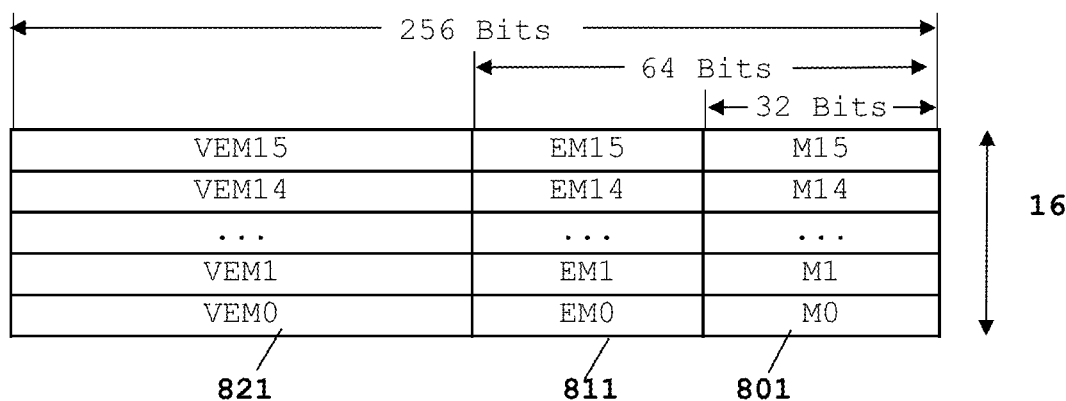
FIG. 8 illustrates the local vector register file shared by the multiply and correlation functional units.

FIG. 8 illustrates local vector register file 523. There are 16 independent 256-bit wide vector registers. Each register of local vector register file 523 can be read as 32-bits scalar data (designated registers M0 to M15 701), 64-bits of scalar data (designated registers EM0 to EM15 711), 256-bit vector data (designated registers VM0 to VM15 721) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
|---|---|
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |

TABLE 1-continued

| Instruction Designation | Register Accessed |
| --- | --- |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15 701), 64-bits of scalar data (designated registers EL0 to EL15 711) or 256-bit vector data (designated registers VL0 to VL15 721). All vector instructions of all functional units can write to local vector register file 524. Only instructions of arithmetic unit 513 and arithmetic unit 514 may read from local vector register file 524.

Figure 9:
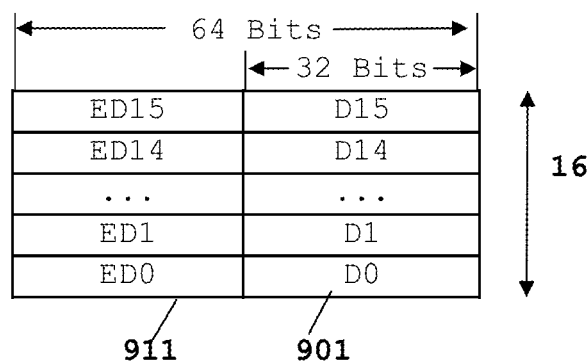
FIG. 9 illustrates local register file of the load/store unit.

FIG. 9 illustrates local register file 525. There are 16 independent 64-bit wide registers. Each register of local register file 525 can be read as 32-bits scalar data (designated registers D0 to D15 701) or 64-bits of scalar data (designated registers ED0 to ED15 711). All scalar and vector instructions of all functional units can write to local register file 525. Only instructions of load/store unit 515 may read from local register file 525. Any vector instructions can also write 64-bit data to local register file 525 with the upper 192 bit data of the result vector discarded. Any vector instructions can also read 64-bit data from the 64-bit local register file 525 registers. The return data is zero-extended in the upper 192-bit to form an input vector. The registers of local register file 525 can only be used as addresses in load/store instructions, not as store data or as sources for 64-bit arithmetic and logical instructions of load/store unit 515.

Figure 10:
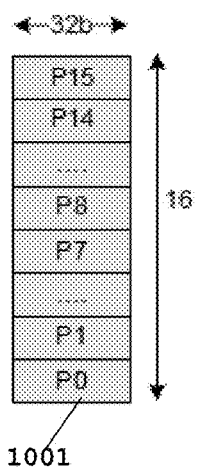
FIG. 10 illustrates the predicate register file.

FIG. 10 illustrates the predicate register file 517. There are sixteen registers 32-bit registers in predicate register file 517. Predicate register file 517 contains the results from vector comparison operations executed by either arithmetic and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 517. Transfers between predicate register file 517 and local register files (523, 524 and 525) are not supported. Each bit of a predication register (designated P0 to P15) controls a byte of a vector data. Since a vector is 256-bits, the width of a predicate register equals 256/8=32 bits. The predicate register file can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packets of fixed length further described below. All instructions require the same number of pipeline phases for fetch and decode, but require a varying number of execute phases.

Figure 11:
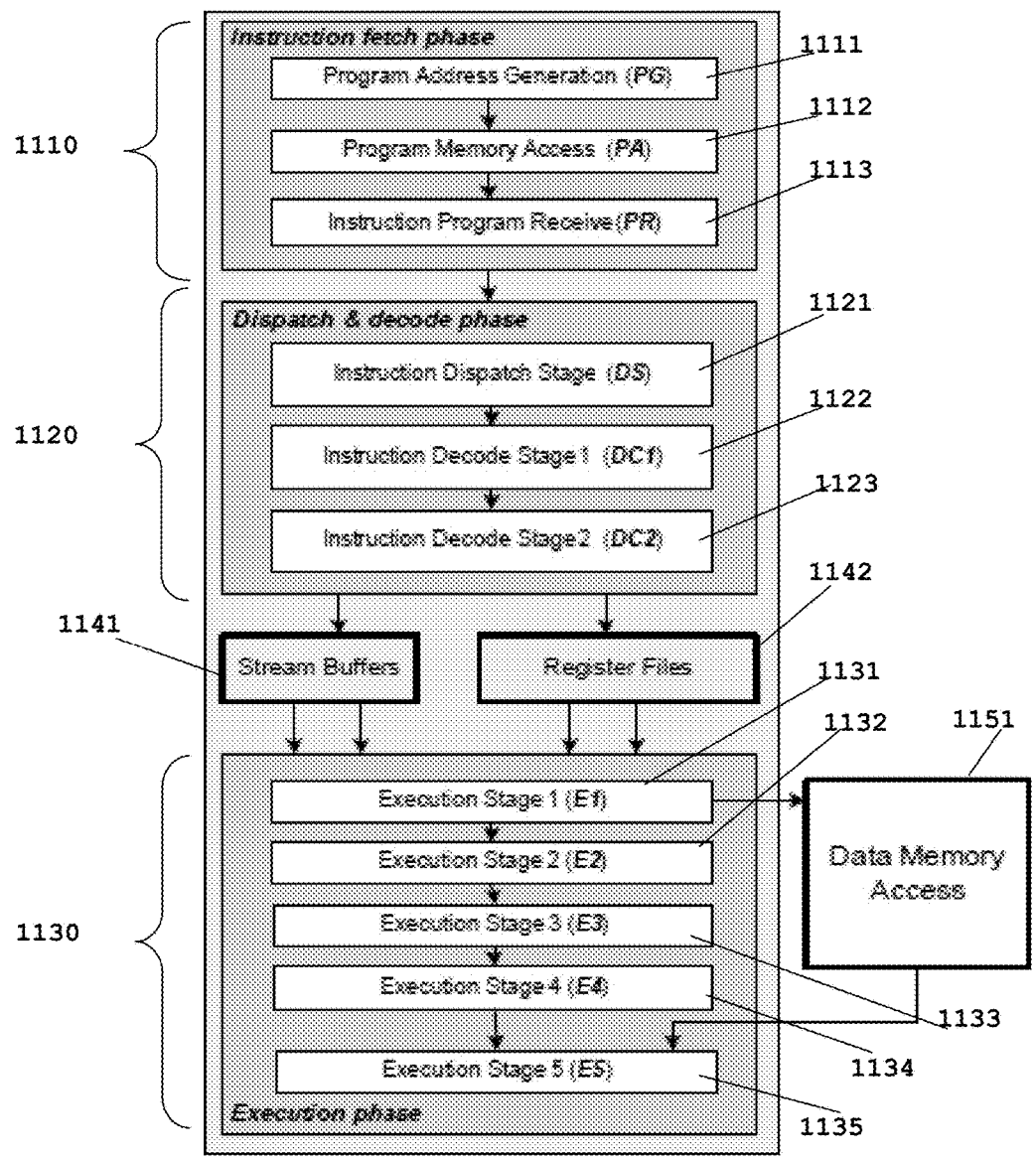
FIG. 11 illustrates the pipeline phases of the central processing unit according to a preferred embodiment of this invention.

FIG. 11 illustrates the following pipeline phases: program fetch phase 1110, dispatch and decode phase 1120 and execution phase 1130. Program fetch phase 1110 includes three stages for all instructions. Dispatch and decode phase 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
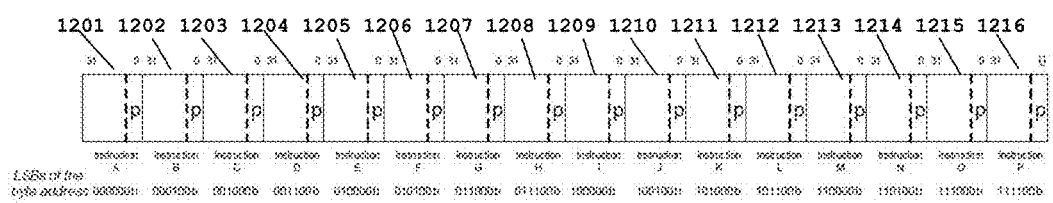
FIG. 12 illustrates sixteen instructions of a single fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phase 1120 include instruction dispatch to appropriate execution unit stage 1121 (DS), instruction pre-decode stage 1122 (DC1); and instruction decode, operand reads stage 1223 (DC2). During instruction dispatch to appropriate execution unit stage 1121 (DS) the fetch packets are split into execute packets and assigned to the appropriate functional units. During the instruction pre-decode stage 1122 (DC1) the source registers, destination registers, and associated paths are decoded for the execution of the instructions in the functional units. During the instruction decode, operand reads stage 1123 (DC2) more detail unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figures 13, 14:
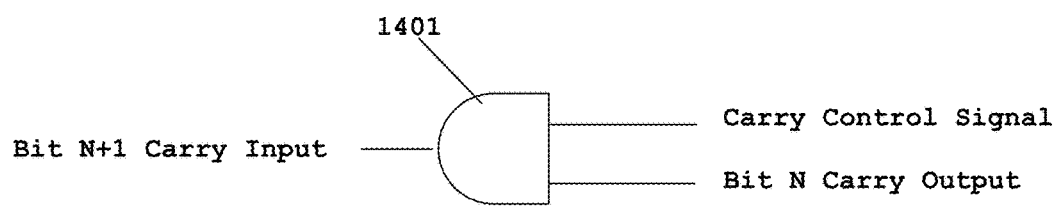
FIG. 13 illustrates an example of the instruction coding of instructions used by this invention.
FIG. 14 illustrates the carry control for SIMD operations according to this invention.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit CREGZ fields for the instructions which are in the same execute packet. Table 3 shows the coding of such a condition code extension slot.

TABLE 3

| Bits | Functional Unit |
|---|---|
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

Special vector predicate instructions use the designated predicate register to control vector operations. In the current embodiment all these vector predicate instructions operate on byte (8 bit) data. Each bit of the predicate register controls whether a SIMD operation is performed upon the corresponding byte of data. The operations of predicate unit 517 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

The dst field specifies a register in a corresponding register file as the destination of the instruction results.

The src2 field specifies a register in a corresponding register file as the second source operand.

The src1/cst field has several meanings depending on the instruction opcode field (bits 2 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 2 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Correlation unit 512 and arithmetic units 513 and 514 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

FIG. 14 illustrates the carry control. AND gate 1401 receives the carry output of bit N within the operand wide arithmetic logic unit (256 bits for arithmetic units 513 and 514, 512 bits for correlation unit 512). AND gate 1401 also receives a carry control signal which will be further explained below. The output of AND gate 1401 is supplied to the carry input of bit N+1 of the operand wide arithmetic logic unit. AND gates such as AND gate 1401 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 4 below shows example carry control signals for the case of a 256 bit wide operand such as used in arithmetic units 513 and 514 which may be divided into sections of 8 bits, 16 bits, 32 bits, 64 bits or 128 bits. No control of the carry output of the most significant bit is needed, thus only 31 carry control signals are required.

TABLE 4

| Data Size | Carry Control Signals | | | | | | | |
| --- | --- | --- | --- | --- | --- | --- | --- | --- |
| 8 bits   | –000 | 0000 | 0000 | 0000 | 0000 | 0000 | 0000 | 0000 |
| 16 bits  | –101 | 0101 | 0101 | 0101 | 0101 | 0101 | 0101 | 0101 |
| 32 bits  | –111 | 0111 | 0111 | 0111 | 0111 | 0111 | 0111 | 0111 |
| 64 bits  | –111 | 1111 | 0111 | 1111 | 0111 | 1111 | 0111 | 1111 |
| 128 bits | –111 | 1111 | 1111 | 1111 | 0111 | 1111 | 1111 | 1111 |
| 256 bits | –111 | 1111 | 1111 | 1111 | 1111 | 1111 | 1111 | 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

This invention relates to the calculation of sum of absolute differences (SAD) between two pixel blocks. This computation is often used as a similarity measure. A lower the sum of absolute differences corresponds to a more similar pair of pixel blocks. This computation is widely used in determining a best motion vector in video compression. The two pixel blocks compared are corresponding locations in time adjacent frames. One block slides within an allowed range of motion and the sum of the absolute differences between the two pixel blocks determines their similarity. A motion vector is determined from the horizontal and vertical displacement between pixel blocks yielding the smallest sum of absolute differences (greatest similarity). This search for a best motion vector is thus very computationally intensive.

The prior art implemented Sum of Absolute Difference (SAD) for specific macro block search, such as 16×16 or 8×8, using a single horizontal pixel line search for Full Search Block Matching (FSBM). This invention implements faster and more power efficient SAD operations for different search block sizes, such as 1×32×32, 2×16×16, 2×8×8, 2×5×5, 2 4×4. These block sizes can be dynamically configured using mask bits in a control register and using double horizontal pixel lines search.

This invention includes correlation unit C 512 instructions for implementing a SAD computation. These instructions calculate the sum of absolute difference between two inputs. This absolute difference is accumulated between two pixels across 16 or 8 pixels based on input precision for each output. This is repeated with window offset by the pixel size for other outputs. A mask bit configures to different block size by zeroing out the absolute difference contribution of pixels outside the block. Thus these absolute differences do not contribute to the sum.

A first instruction of this class is called DVSADM8O16B16H (dual horizontal line search) which implements a sliding window correlation using sum of absolute difference of the unsigned 8 bit candidate and reference pixels at an offset of 8 bits or 1 pixel. This instruction uses a double horizontal line search (c(0) to c(15) and c(16) to c(31)). This instruction takes two sets of unsigned 8 bit candidate pixels (c(0) to c(15) and c(16) to c(c31)) as the src2 input and two sets of unsigned 8 bit reference pixels (r(0) to r(30) and r(32) to r(62)) as src1 input. This instruction also receives 2 sets of 1 bit mask (mask(0) to mask(15) and mask(16) to mask(31)) from an implicitly specified control register. This instruction accumulates sum of absolute differences between candidate and reference pixels across two sets of 16 pixels and produce 2 outputs of half word precision. This instruction repeats this calculation for 2 sets of candidate pixel in src2 against 2×16 sets of 16 pixels in src1 and produces 2 16 half-words (16 bit) outputs. The mask input can zero out SAD contribution to accumulation and configure a different block search. A src2 operand width of 256 bits (32 pixels by 8 bits per pixel) is selected by a single vector operand and a src1 operand width of 512 bits is selected by a vector register pair. The output width of 512 bits (32 SADs of 16 bits each) is stored in a register pair corresponding to dst (FIG. 13). The register number of the dst field of the instruction is limited to an even register number. The 256 lower bits of the 512 bit operand are stored in the designated register number and the 256 bits upper bits are stored in the register with the next higher register number.

Figure 15A:
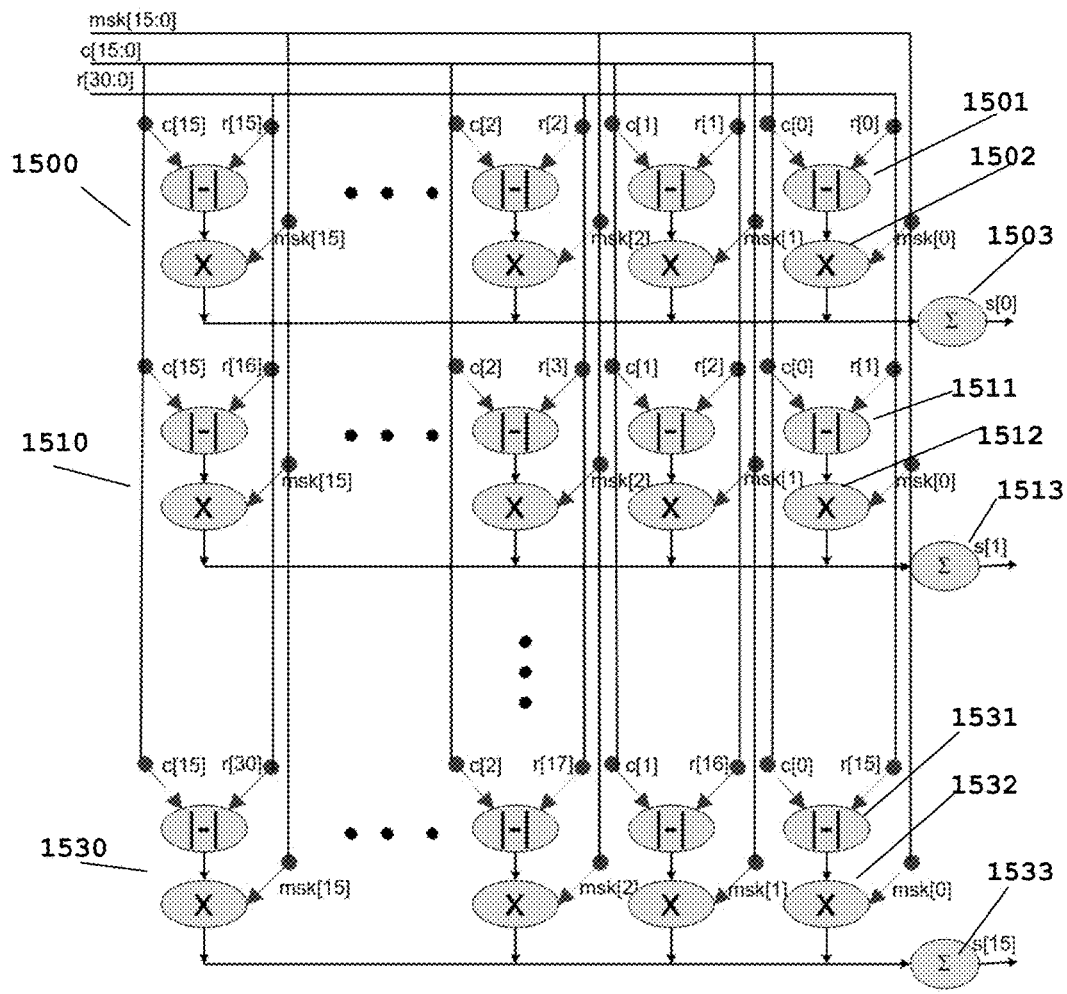
FIGS. 15A and 15B together illustrate a first example of a SAD instruction according to this invention.
Figure 15B:
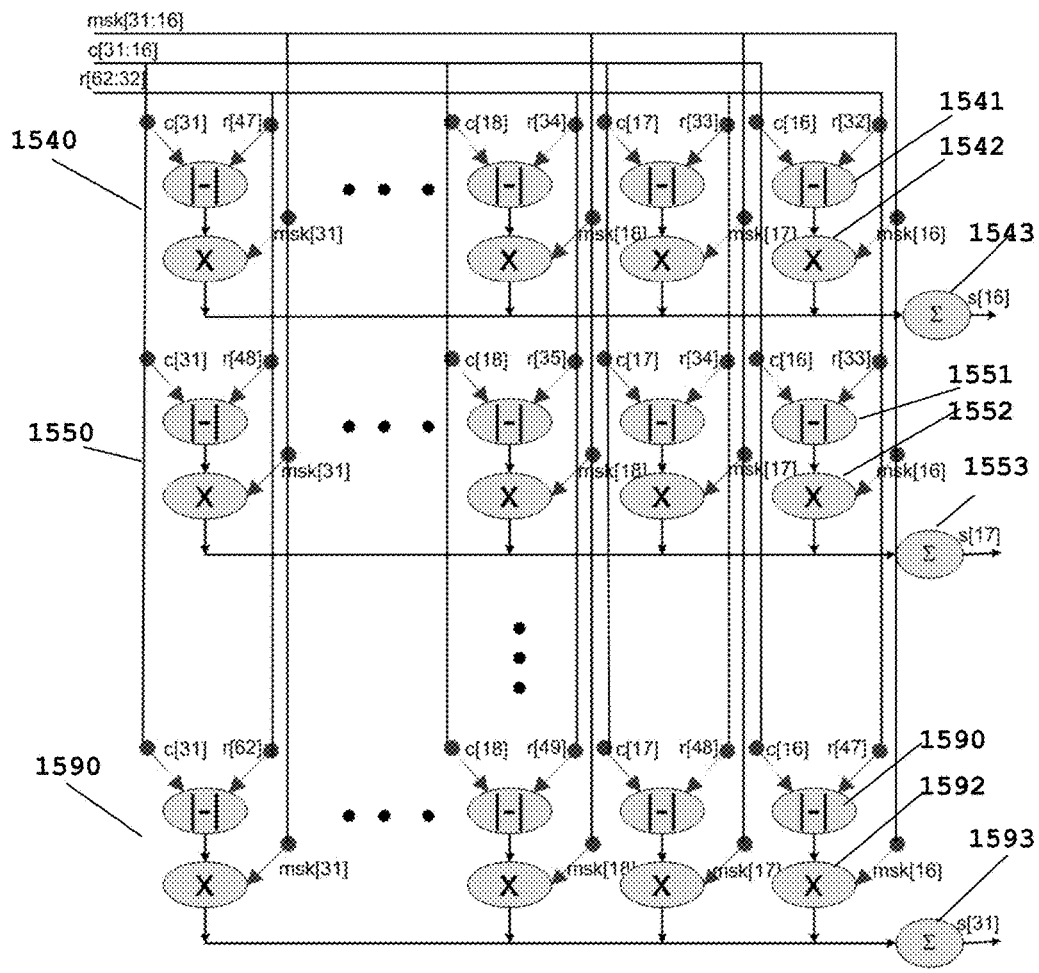

This instruction is illustrated in FIGS. 15A and 15B. FIG. 15A illustrates 16 rows 1500, 1510 . . . 1530. Each row includes 16 absolute value of difference units such as 1501, 1511 . . . 1531. The absolute value of difference units receive a first input of a corresponding candidate pixel c(i) and a second input of a corresponding reference pixel r(i). A multiplier such as multipliers 1502, 1512 . . . 1532 receives the absolute value and corresponding mask bit m(i). The product is supplied to the summer 1503, 1513 . . . 1533 of the corresponding row. FIG. 15B illustrates a second half including 16 rows 1540, 1550 . . . 1590. Each row includes 16 absolute value of difference units such as 1541, 1551 . . . 1591. The absolute value of difference units receive a first input of a corresponding candidate pixel c(i) and a second input of a corresponding reference pixel r(i). A multiplier such as multipliers 1542, 1552 . . . 1592 receives the absolute value and corresponding mask bit m(i). The product is supplied to the summer 1543, 1553 . . . 1593 of the corresponding row. As shown in FIG. 15A for the first half the in row 1500 the candidate and the reference pixels have the same index. Thus row 1500 receives candidates pixels c(0) to c(15) and reference pixels r(0) to r(15). For each following row the reference pixels are offset by one pixel. Thus row 1530 receives candidate pixels c(0) to c(15) as other rows but receives reference pixels r(15) to r(30). As shown in FIG. 15B for the second half in row 1540 receives candidate pixels c(16) to c(31) and the reference pixels r(32) to r(47). For each following row the reference pixels are offset by one pixel. Thus row 1590 receives candidate pixels c(16) to c(31) as other rows but receives reference pixels r(62) to r(47). The whole apparatus of FIGS. 15A and 15B performs dual lines search using 2 sets of candidate pixels and 2 sets of reference pixels and generates 2 sets of 16 16 bit sum of absolute differences s(0) to s(15) and s(16) to s(31).

A second instruction of this type called DVSADM16O8H8 W (dual horizontal line search) which implements a sliding window correlation using sum of absolute difference of the unsigned 16 bit candidate pixels and reference pixels at an offset of 16 bits or 1 pixel. This instruction uses double horizontal line search (c(0) to c(7) and c(8) to c(15)). This instruction takes two sets of unsigned 16-bit candidate pixels (c(0) to c(7) and c(8) to c(c15)) as src2 input. This instruction takes two sets of unsigned 16-bit reference pixels (r(0) to r(14) and r(15) to r(30)) as src1 input. This instruction takes 2 sets of 1 bit mask (mask(0) to mask(7) and mask(8) to mask(15)) from an implicitly defined control register. This instruction accumulates sum of absolute differences between src2 and src1 pixels across two sets of 8 pixels and produce 2 outputs of word (32 bit) precision. This instructions repeats this calculation for 2 sets of candidate pixels in src2 against 2×8 sets of 8 pixels in src1 and produces 2 by 8 word (32 bit) outputs. The mask input can zero out SAD contribution to accumulation and configure a different block search. A src2 operand width of 256 bits (16 pixels by 16 bits per pixel) is selected by a single vector operand and the src1 operand width of 512 bits is selected by a vector register pair. The output width of 512 bits (16 SADs of 32 bits each) is stored in a register pair corresponding to dst (FIG. 13). The register number of the dst field of the instruction is limited to an even register number. The 256 lower bits of the 512 bit operand are stored in the designated register number and the 256 bits upper bits are stored in the register with the next higher register number.

Figure 16A:
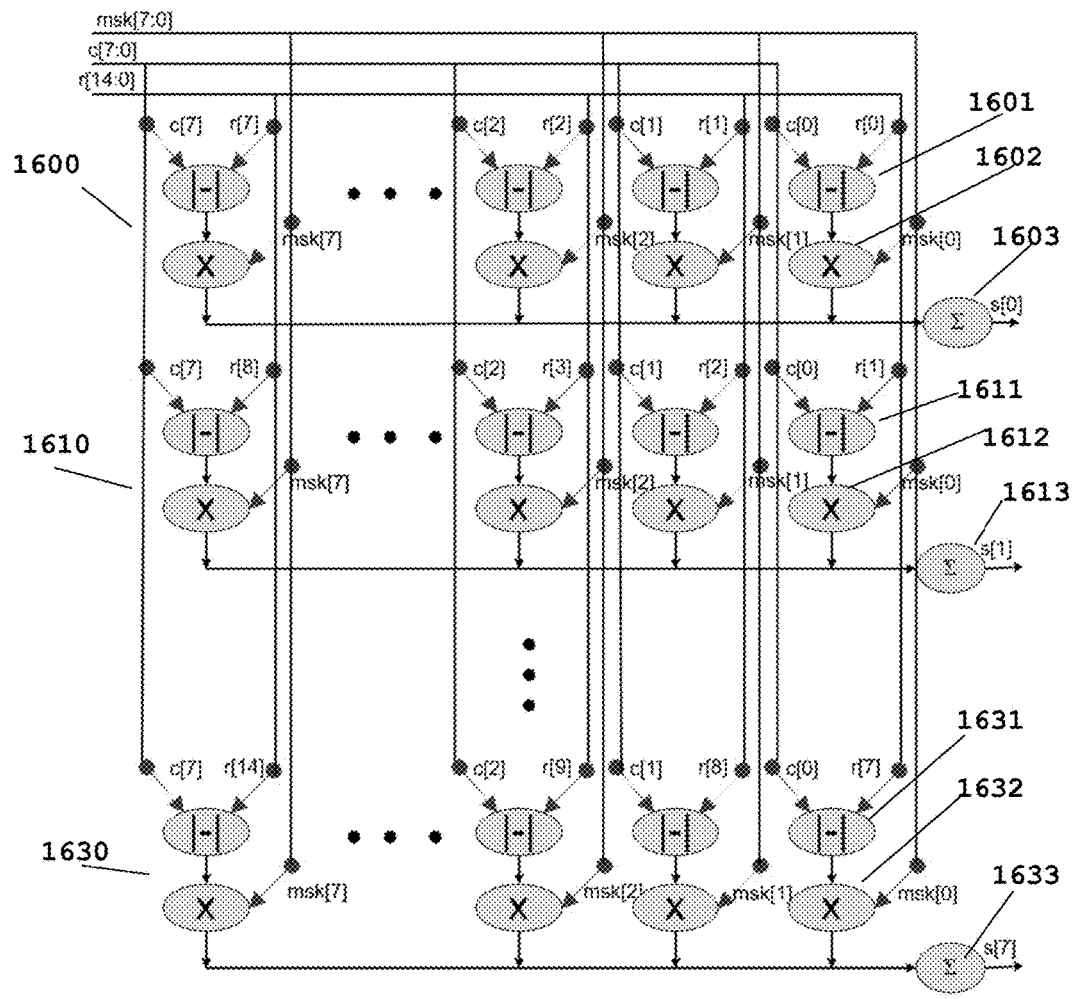
FIGS. 16A and 16B together illustrate a second example of a SAD instruction according to this invention.
Figure 16B:
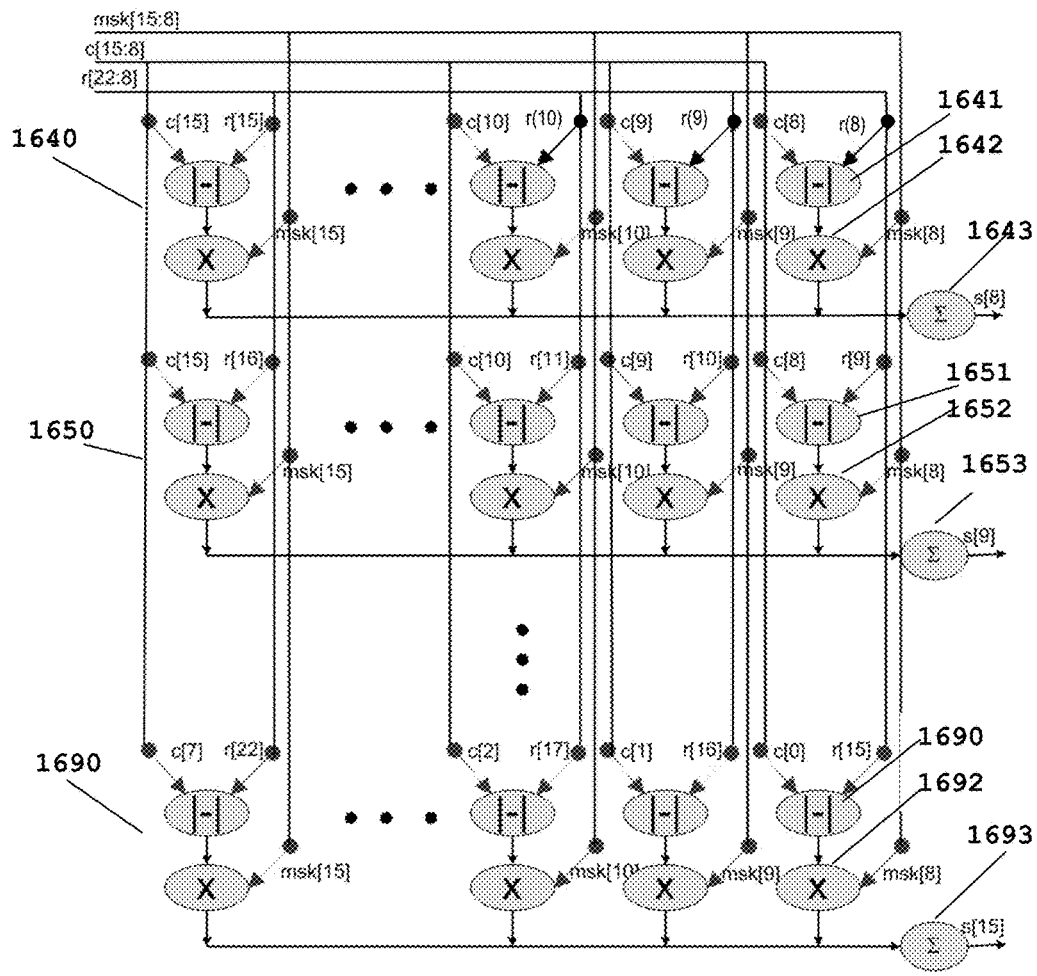

This instruction is illustrated in FIGS. 16A and 16B. FIG. 16A illustrates 8 rows 1600, 1610 . . . 1630. Each row includes 8 absolute value of difference units such as 1601, 1611 . . . 1631. The absolute value of difference units receive a first input of a corresponding candidate pixel c(i) and a second input of a corresponding reference pixel r(i). A multiplier such as multipliers 1602, 1612 . . . 1632 receives the absolute value and corresponding mask bit m(i). The product is supplied to the summer 1603, 1613 . . . 1633 of the corresponding row. FIG. 16B illustrates a second half including 8 rows 1640, 1650 . . . 1690. Each row includes 8 absolute value of difference units such as 1641, 1651 . . . 1691. The absolute value of difference units receive a first input of a corresponding candidate pixel c(i) and a second input of a corresponding reference pixel r(i). A multiplier such as multipliers 1542, 1552 . . . 1592 receives the absolute value and corresponding mask bit m(i). The product is supplied to the summer 1553, 1553 . . . 1593 of the corresponding row. As shown in FIG. 15A for the first half the in row 1500 the candidate and the reference pixels have the same index. Thus row 1500 receives candidates pixels c(0) to c(7) and reference pixels r(0) to r(7). For each following row the reference pixels are offset by one pixel. Thus row 1530 receives candidate pixels c(0) to c(7) as other rows but receives reference pixels r(7) to r(14). As shown in FIG. 15B for the second half the in row 1540 receives candidate pixels c(8) to c(15) and the reference pixels r(8) to r(16). For each following row the reference pixels are offset by one pixel. Thus row 1590 receives candidate pixels c(8) to c(15) as other rows but receives reference pixels r(15) to r(22). The whole apparatus of FIGS. 16A and 16B performs dual line search using 2 sets of candidate pixels and 2 sets of reference pixels and generates 2 sets of 8 32 bit sum of absolute differences s(0) to s(7) and s(8) to s(15).

FIG. 17 schematically illustrates the comparisons of the DVSADM16O8H8 W instruction illustrated in FIGS. 16A and 16B. Row 1600 forms the SAD of the candidate pixels c(0) to c(7) with respective reference pixels r(0) to r(7). Row 1610 forms the SAD of the candidate pixels c(0) to c(7) with respective reference pixels r(1) to r(8). The candidate pixels shift relative to the reference pixels and row 1630 forms the SAD of the candidate pixels c(0) to c(7) with respective reference pixels r(7) to r(14). The second 8 rows are completely distinct from the first 8 rows. Row 1640 forms the SAD of the candidate pixels c(8) to c(15) with respective reference pixels r(9) to r(15). Row 1650 forms the SAD of the candidate pixels c(8) to c(15) with respective reference pixels r(9) to r(16). The candidate pixels shift relative to the reference pixels and row 1690 forms the SAD of the candidate pixels c(8) to c(15) with respective reference pixels r(15) to r(22). With appropriate packing of pixel data this one instruction can form SAD calculations for two rows of a candidate block. A similar schematic view of the DVSADM8O16B16H instruction illustrated in FIGS. 15A and 15B is possible. This view is similar to FIG. 17 but is omitted because the number of pixels and rows would make illustration too busy.

A third instruction DVSADM8O16B32H is same as DVSADM8O16B16H except that it searches one horizontal line candidate pixels across 32 sets of 16 reference pixels.

A fourth instruction DVSADM16O8H16 W is same as DVSADM16O8H8 W except that it searches one horizontal line candidate pixels across 16 sets of 8 reference pixels.

Figure 18:
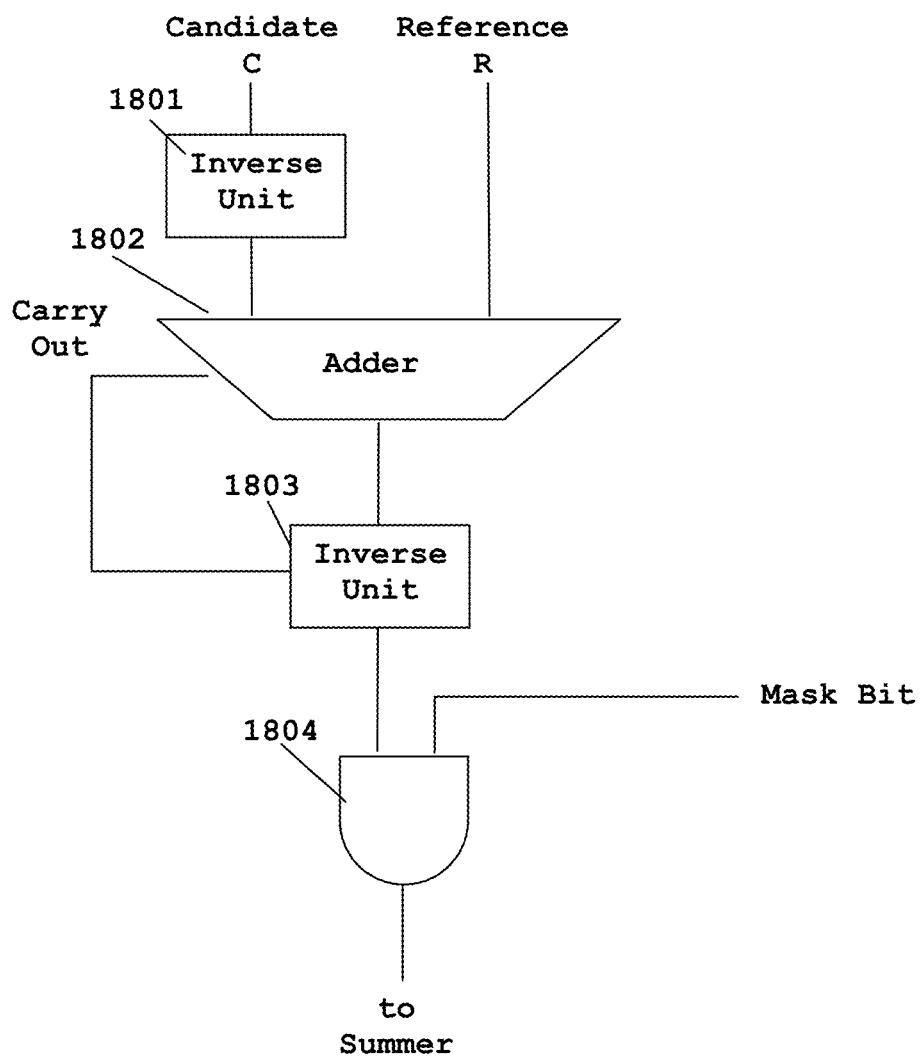
FIG. 18 illustrates a manner to implement the absolute value of difference units and corresponding multipliers illustrated in FIGS. 15A, 15B, 16A and 16B.

FIG. 18 illustrates a manner to implement the absolute value of difference units and corresponding multipliers illustrated in FIGS. 15A, 15B, 16A and 16B. The difference is formed by inversion and addition. Inverse unit 1801 forms the arithmetic inverse of the candidate pixel input c. This arithmetic inversion may be performed by a two's complement of the input number. The two's complement is based upon the relation −X=~X+1. A two's complement can thus be generated by inverting the number and adding 1. The addition of 1 can be achieved by asserting a carry input to the lowest bit of adder 1802. Adder 1802 adds the inverse of the candidate input and the reference input. Adder 1802 may generate an active carry output depending on the data inputs. If adder 1802 does not generate an active carry output, then the reference pixel value is greater than the candidate pixel value and the difference is positive. Thus the absolute value of the difference is the same as the difference. If adder 1802 generates an active carry output, then the candidate pixel value is greater than the reference pixel value and the difference is negative. Thus the absolute value of the difference is the arithmetic inverse of the difference. Inverse unit 1803 forms the arithmetic inverse the output of adder 1802 if adder 1802 generates an active carry output. Otherwise inverse unit 1803 leaves its input unchanged. Multipliers 1503, 1513, 1533, 1543, 1553, 1593, 1603, 1613, 1633, 1643, 1653 and 1693 are implemented via and AND gate 1804 because the mask input is a single bit. If the mask input is 1, then the absolute value is unchanged. If the mask value is 0, then the absolute value is set of all 0s. The output of AND gate 1804 is supplied to an input of the summer of the corresponding row.

This illustrates how the same hardware can be used to perform the two instructions DVSADM8O16B16H (FIGS. 15A and 15B) and DVSADM16O8H8 W (FIGS. 16A and 16B). The adders 1802 can be constructed with carry control as shown in FIG. 14. In a first mode adders 1802 operate on 8 bit data by breaking the carry chain at 8 bit boundaries (DVSADM8016B16H). In a second mode adders 1802 operate on 16 bit data by breaking the carry chain at 16 bit boundaries (DVSADM16O8H8 W). The nature of the packed data means the data path between bits of the operand and input bits of the adders 1802 is the same for both modes. A similar carry chain control operates on the row adders 1503, 1513, 1533, 1543, 1553, 1593, 1603, 1613, 1633, 1643, 1653, 1693. Similarly the relationship between the row adder output bits and the destination bits is unchanged due to the nature of the packed data.

This invention can perform 512 8 bit or 256 16 bit absolute differences per cycle as compared to 8 8 bit or 4 16 bit absolute differences per cycle in prior art. This results in an improvement of sixty four times. Proposed art dynamically performs different block searches using mask bits in control registers. This invention may also perform two horizontal pixel line searches in a single instruction in addition the a single horizontal line search.

What is claimed is:

1. A method of digital signal processing comprising the steps of:
   storing data in a plurality of data registers of a data register file, each data register designated by a corresponding register number;
   storing instructions, each instruction specifying a data processing operation and at least one data operand by register number, at least one instruction specifying a sum of absolute differences (SAD) operation;
   sequentially recalling said stored instructions;
   decoding said specified data processing operation and said specified at least one operand of each recalled instruction;
   performing data processing operations upon at least one operand corresponding to a decoded instruction, said data processing operations including, in response to an instruction specifying a sum of absolute differences (SAD) operation, performing a sum of absolute differences (SAD) operation comprising two sets of a plurality of rows, each row producing a SAD output and including
      performing a plurality of absolute value difference operations employing a plurality of absolute difference units, each absolute difference unit having a first input receiving candidate pixel data packed within data stored in a first instruction specified data register and a second input receiving corresponding reference pixel data packed within data stored in a second instruction specified data register, an output generating a corresponding output,
      summing said outputs of each absolute value difference operation in each row forming a row sum output via a row summer connected to said output of each absolute difference unit in said row, and
      wherein said candidate pixels are offset relative to said reference pixels by one pixel for each succeeding row in a set of rows;
   wherein said sum of absolute differences (SAD) operation includes a first mode forming 2M SADs from N bit pixel data and a second mode forming M SADs from 2N bit pixel data, said first mode and said second mode selected by carry chain control in said plurality of absolute value difference units and said row summers; and
   wherein a first set of a plurality of rows operates on pixel data in a first half of said first instruction specified data register and a second set of a plurality of rows operates on pixel data in a second half of said first instruction specified data register.

2. The method of digital signal processing of claim 1, wherein:
   each of said plurality of absolute value difference operations of each row further receives a mask input, wherein said output is 0 if said corresponding mask input has a first digital state.

3. The method of digital signal processing of claim 1, wherein:
   said stored instructions each further specify a data destination by a register number; and
   said step of performing said sum of absolute differences (SAD) operations is further operable to store said SAD outputs as packed data within a data register specified by said data destination of said corresponding instruction.

4. A method of digital signal processing comprising the steps of:
   storing data in a plurality of data registers of a data register file, each data register designated by a corresponding register number;
   storing instructions, each instruction specifying a data processing operation and at least one data operand by register number, at least one instruction specifying a sum of absolute differences (SAD) operation;
   sequentially recalling said stored instructions;
   decoding said specified data processing operation and said specified at least one operand of each recalled instruction;
   performing data processing operations upon at least one operand corresponding to a decoded instruction, said data processing operations including, in response to an instruction specifying a sum of absolute differences (SAD) operation, performing a sum of absolute differences (SAD) operation comprising two sets of a plurality of rows, each row producing a SAD output and including performing a plurality of absolute value difference operations employing a plurality of absolute difference units, each absolute difference unit having a first input receiving candidate pixel data packed within data stored in a first instruction specified data register and a second input receiving corresponding reference pixel data packed within data stored in a second instruction specified data register, an output generating a corresponding output, including forming an arithmetic inversion of a value of said first input, forming an arithmetic sum of values of said first input and said second input and a carry output, conditionally forming an arithmetic inversion of a value of said arithmetic sum dependent upon a value of said carry output, and logically ANDing said output of said conditional second inverting and a corresponding mask input, summing said outputs of each absolute value difference operation in each row forming a row sum output via a row summer connected to said output of each absolute difference unit in said row, and wherein said candidate pixels are offset relative to said reference pixels by one pixel for each succeeding row in a set of rows;

wherein said sum of absolute differences (SAD) operation includes a first mode forming 2M SADs from N bit pixel data and a second mode forming M SADs from 2N bit pixel data, said first mode and said second mode selected by carry chain control in said plurality of absolute value difference units and said row summers; and wherein a first set of a plurality of rows operates on pixel data in a first half of said first instruction specified data register and a second set of a plurality of rows operates on pixel data in a second half of said first instruction specified data register.

5. The method of digital signal processing of claim 4, wherein:

said stored instructions each further specify a data destination by a register number; and said step of performing said sum of absolute differences (SAD) operations is further operable to store said SAD outputs as packed data within a data register specified by said data destination of said corresponding instruction.

* * * * *